April 29, 1952   H. W. FRANTZ ET AL   2,594,632
COMBINE HITCH
Filed July 3, 1950
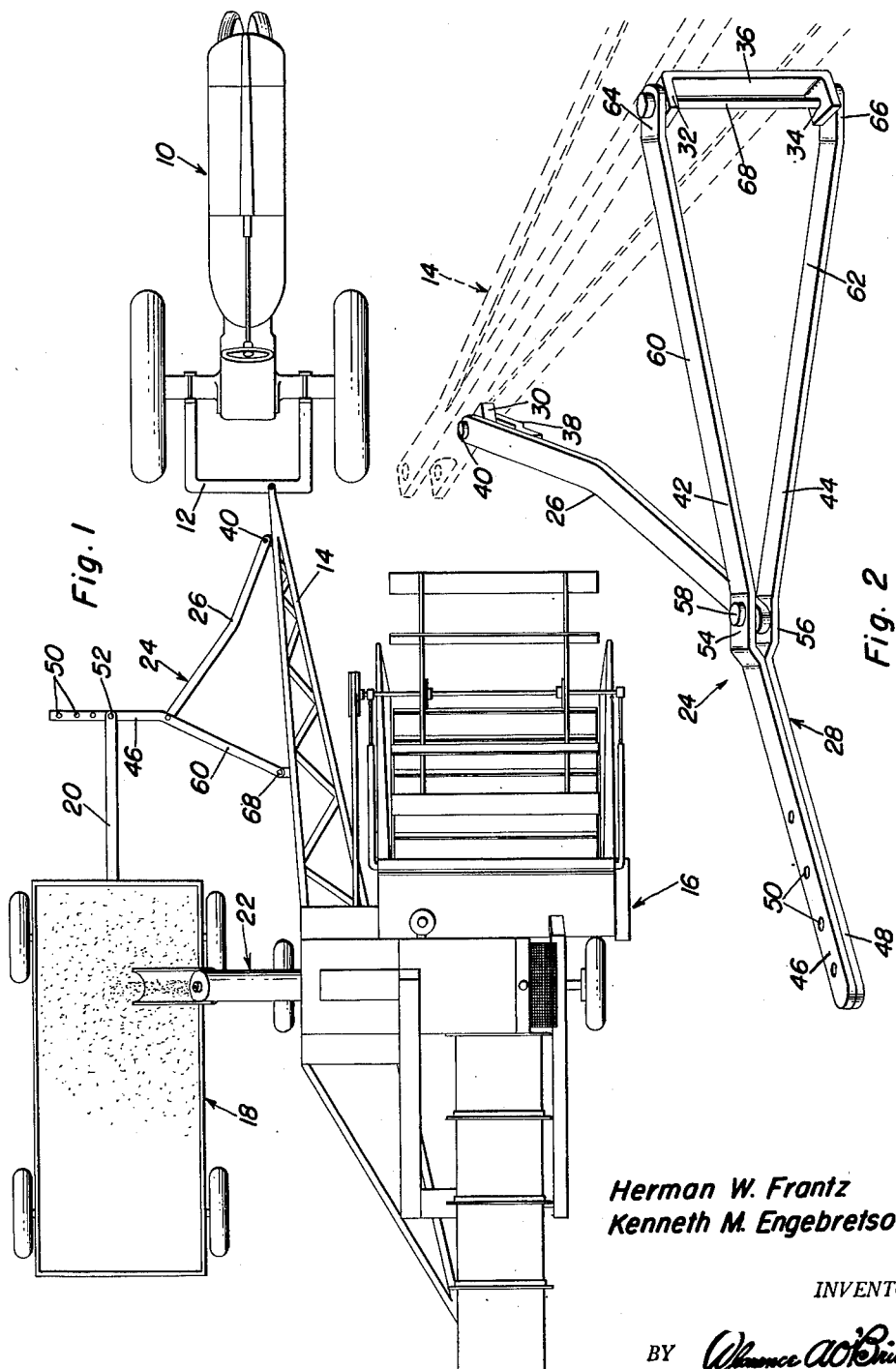
Herman W. Frantz
Kenneth M. Engebretson
INVENTORS Patented Apr. 29, 1952

2,594,632

UNITED STATES PATENT OFFICE 2,594,632

COMBINE HITCH

Herman W. Frantz and Kenneth M. Engebretson, Marietta, Minn.

Application July 3, 1950, Serial No. 171,984

1 Claim. (Cl. 280—33.44)

This invention relates to novel and useful improvements in a combine hitch and more specifically pertains to a draft hitch for use with combines and a trailer employed in conjunction therewith.

The primary object of this invention is to provide a draft hitch specifically adapted for connecting a trailer to the side of a combine and to the tow bar of the same for receiving the grain threshed by the combine and for connecting the trailer and combine for joint movement by a tractor or the like.

A further object of the invention is to provide an improved draft hitch in accordance with the preceding object which shall be of a sturdy, yet simple construction, highly efficient for the purposes intended, easily applied to or moved from the tow bar of a combine, and capable of adjustable connection with the tongue of a trailer.

Yet another important object of the invention is to provide a draft hitch as set forth in the foregoing objects which may be readily disengaged from the trailer and pivotally folded back against the tow bar of the combine when its use is not required.

A final important object of the invention to be specifically enumerated herein, is to provide a draft hitch in accordance with the preceding objects in which the adjustment of the trailer with respect to the combine may be readily effected by a simple manipulation of the hitch, and wherein the latter may be readily employed with a variety of makes of combines.

These, together with various ancillary features and objects of the invention, which will later become apparent as the following description proceeds, are attained by the present invention, a preferred embodiment of which has been illustrated, by way of example only, in the accompanying drawings, wherein:

Figure 1 is a top plan view showing a suitable construction of draft hitch incorporating therein the principle of this invention and illustrated as applied to connect a trailer with a combine, a towing tractor being illustrated as operatively connected to the tow bar of the combine; and Figure 2 is a perspective view of the improved draft hitch forming the subject of this invention, the manner of which the same is applied to the tow bar of a combine being indicated in dotted lines therein.

In the operation of combines, which are customarily provided with tow bars for connection with the draw bar of a tractor, the grain harvested and threshed by the same is customarily stored in a hopper which is of a relatively limited capacity. When the hopper has been filled, it is necessary to stop the operation of the combine until the contents of the hopper can be discharged into a trailer towed by a second tractor. In order to maintain the combine in continuous operation, it is usually necessary to employ a pair of trailers each operated and towed by a separate tractor, so that a trailer and tractor will be available for receiving the contents of the combine hopper when the other trailer is discharging its contents to any suitable storage depot.

This conventional practice has heretofore necessitated the use of three tractors, each having an operator or driver together with two trailers and a combine in order to maintain a single combine in continuous and consequential economical operation.

It is the primary purpose of the present invention to materially reduce the number of trailers, tractors and workmen required to maintain a single combine in continuous operation. In general, the aims of this invention are attained by a draft hitch specifically adapted for operatively connecting a trailer in proper operative connection with the side of a combine and to the draw bar of the same, whereby trailer and combine may be towed as a unit by a single tractor.

Referring now more specifically to the accompanying drawings, wherein like numerals designate similar parts throughout the various views, it will be seen that a conventional form of farm tractor indicated generally by the numeral 10 is provided with a draw bar 12 which is adjustably and pivotally connected to the forward end of a tow bar 14 and associated in a conventional form of combine indicated generally at 16.

In accordance with this invention, any conventional form of trailer indicated at 18 and provided with a tongue 20 is operatively connected to the tow bar 14 of the combine by the mechanism set forth hereinafter, and a conveyor chute or the like indicated herein by the numeral 22 discharges the threshed grain into the trailer 18.

The improved draft hitch forming the subject of this invention is designated herein by the numeral 24 and is adapted to be removably pivoted to the tow bar 14 and to be removably and adjustably pivoted to the tongue 20, whereby the hitch will serve to couple the trailer to the combine for proper correlated movement therewith.

Referring now more specifically to Figure 2, it will be seen that the improved hitch consists of a pair of leg members indicated generally at 26 and 28. One end of each of these leg members is detachably and pivotally secured to laterally extending lugs 30, 32 and 34 carried by and mounted upon the side of the tow bar 14. As will be readily apparent from Figure 2, the lugs 32 and 34 are disposed in parallel relation and constitute integral angulated terminal portions of a support bracket 36. At its end just described, the leg member 26 has secured thereto, as by welding or the like, a bracket 38 whereby in effect this end of the leg member 26 is bifurcated to embrace the lug 30 and to be detachably pivoted thereto as by a removable pivot pin 40.

The other leg member 28 comprises a pair of bars 42 and 44 having end portions 46 and 48 which are disposed in juxtaposed side by side relation and are provided with longitudinally spaced apertures 50 constituting means for receiving a removable pivot pin 52, by means of which the draft hitch may be adjustably and detachably secured to the tongue 20 of the trailer.

Intermediate their ends, the bars 42 and 44 are provided with angularly offset, parallel portions 54 and 56 which embrace the other end of the leg member 26 and are pivoted thereto as by a pivot pin or bolt 58.

Extending from their mid-portions to their other end, the bars 42 and 44 are provided with angulated, divergent portions 60 and 62, which at their extremities have parallel end portions 64 and 66 which embrace the lugs 32 and 34 and are pivoted thereto as by a removable pivot pin or hinge 68.

It will now be apparent that when the draft hitch is installed as shown in Figures 1 and 2, that upon towing of the combine by the tow bar 14 of the same, the trailer 18 will likewise be towed through the rigid draft hitch assembly consisting of the leg members 26 and 28, and the adjusting apertures 50 with the pivot pin 52 which permits lateral adjustment of the trailer with respect to the combine.

However, when it is desired to uncouple the trailer as when the same has been loaded and it is desired to couple a fresh trailer to the combine, it is merely necessary to disengage the pivot pin 52, whereupon a second and empty trailer can be readily coupled to the combine.

When it is desired to dispense with the trailer, as when the combine is leaving or approaching a field to be worked by the same, the pivot pin 52 will be disengaged and either of the pins 40 or 68 will be removed whereby the draft hitch will have its leg assemblies folded together and folded against the tow bar 14 in a compact manner.

From the foregoing, the construction and operation of the device, together with its many advantages will be readily understood and further explanation is believed to be unnecessary. However, since numerous modifications and changes will readily occur to those skilled in the art, after a consideration of the foregoing specification and accompanying drawings, it is not desired to limit the invention to the exact construction shown and described, but all suitable modifications and equivalents may be resorted to, falling within the scope of the appended claim.

Having described the invention, what is claimed as new is:

A draft hitch for use with combines comprising a pair of leg members pivoted at one end of each to a tow bar of a combine in longitudinally spaced relation, the other end of one leg member being pivoted to the other leg member intermediate the ends of the latter, the other end of the other leg member having a plurality of spaced apertures for selective pivotal connection to the tongue of a trailer, said other leg member comprising a pair of bars, having the end portions attached to the tow bar divergent with respect to each other, the bars having parallel portions embracing the other end of the first-mentioned leg member, the ends of the bars having said apertures being disposed in side by side juxtaposition.

HERMAN W. FRANTZ.
KENNETH M. ENGEBRETSON.

REFERENCES CITED

The following references are of record in the file of this patent:

UNITED STATES PATENTS

| Number | Name | Date |
| --- | --- | --- |
| 1,959,065 | Rosenthal | May 15, 1934 |
| 1,992,429 | Hyman | Feb. 26, 1935 |
| 2,512,097 | Goodspeed | June 20, 1950 |
| 2,524,669 | Knoblauch | Oct. 3, 1950 |